US005645762A

United States Patent [19]
Cook et al.

[11] Patent Number: 5,645,762
[45] Date of Patent: Jul. 8, 1997

[54] DEFOAMER COMPOSITION AND METHOD OF USING THE SAME

[75] Inventors: Anthony B. Cook, Simpsonville, S.C.; John J. Palmer, Stanfield, N.C.; Jose M. Rodriguez, Fort Mill, S.C.

[73] Assignee: Henkel Corporation, Plymouth Meeting, Pa.

[21] Appl. No.: 704,180

[22] Filed: Aug. 28, 1996

Related U.S. Application Data

[63] Continuation of Ser. No. 322,900, Oct. 13, 1994, abandoned.

[51] Int. Cl.$^6$ ............................ B01D 19/04; D21H 21/12
[52] U.S. Cl. ............................ 252/321; 162/29; 162/60; 252/358
[58] Field of Search ............................ 252/321, 358; 162/60, 72, 75, 29

[56] References Cited

U.S. PATENT DOCUMENTS

| | | | |
|---|---|---|---|
| 3,639,240 | 2/1972 | Mutchler | 252/396 X |
| 3,671,458 | 6/1972 | Sherman et al. | 252/358 X |
| 4,332,696 | 6/1982 | Slovinsky et al. | 252/321 |
| 4,719,084 | 1/1988 | Schmid et al. | 562/587 X |
| 4,844,744 | 7/1989 | Leiter et al. | 134/40 |
| 5,403,440 | 4/1995 | Daute et al. | 162/5 |
| 5,442,082 | 8/1995 | Uphues et al. | 554/149 |

FOREIGN PATENT DOCUMENTS

| | | |
|---|---|---|
| 40 38 608 A1 | 6/1992 | Germany. |
| WO91/11424 | 8/1991 | WIPO. |
| WO92/06240 | 4/1992 | WIPO. |

OTHER PUBLICATIONS

Hawley's Condensed Chemical Dictionary, (Van Nostrand Reinhold Co., Inc. NY., NY., 1987) p. 31.

Kirk–Othmer Ency. of Chem. Tech., vol. 7, (John Wiley & Sons, Inc., NY, NY, 1979) pp. 430–448.

*Primary Examiner*—Richard D. Lovering
*Assistant Examiner*—Daniel S. Metzmaier
*Attorney, Agent, or Firm*—Ernest G. Szoke; Wayne C. Jaeschke; Real J. Grandmaison

[57] ABSTRACT

A defoamer composition made from the reaction product of an epoxide containing composition selected from epoxide fatty acids, epoxide vegetable oils and mixtures thereof and at least one secondary compound selected from the group consisting of fatty acids and alkoxylated derivatives thereof, alkoxylated polyols, alcohols, alkoxylated alcohols, alkylphenols, alkoxylated alkylphenols, alkylamides, alkoxylated alkylamides, acetylenic glycols, alkoxylated acetylenic glycols, polybasic acids, alkylene oxides, organo silicones and polymers thereof, and methods of using the same especially for defoaming black liquor produced in the pulp and paper industry.

7 Claims, No Drawings

DEFOAMER COMPOSITION AND METHOD OF USING THE SAME

This application is a continuation of application Ser. No. 08/322,900 filed on Oct. 13, 1994, now abandoned.

FIELD OF THE INVENTION

This invention relates to defoamers for use in aqueous systems particularly for the pulp and paper industry.

DESCRIPTION OF RELATED ART

Defoamers used in the pulp and paper industry must be efficient at reducing foam in aqueous systems. Foam is the result of surface active compounds becoming entrained with air due to violent agitation during processing such as occurs in the filter washing of pulp slurries in paper mills. In the continuous filter washing of pulp in a Kraft mill, black liquor develops which is among the hardest mediums common to the industry and the most difficult to defoam.

Efforts have been made to provide defoamer compositions suitable for defoaming aqueous systems. For example, *Ency. of Chem. Tech.* vol. 7 pp. 444 discloses solutions of saturated fatty acids and fatty alcohols or blends of polyethylene glycol esters in a mineral oil carrier as available for defoaming pulp solutions. Such defoamers are disadvantageous because dissolved fats or fatty acids come out of solution at low temperatures.

Albert H. Sherman et al., U.S. Pat. No. 3,671,458 disclose ethers of fatty epoxides and polyhydric alcohols which are useful as defoamers. Manuel Slovinsky et al., U.S. Pat. No. 4,332,696 disclose a defoamer composition containing an insoluble organic liquid and a hydrophobic silica suspended in an organic liquid in which the silica has at least a portion of its surface esterified with a fatty alcohol or a fatty epoxide.

Despite these efforts there is the need to provide defoamer compositions with superior defoaming properties that are especially effective in defoaming black liquor generated in the pulp and paper industry.

SUMMARY OF THE INVENTION

The present invention is generally directed to defoamer compositions for use in defoaming aqueous compositions, especially in the defoaming of black liquor.

In particular, the defoamer composition of the present invention comprises the reaction product of an epoxide containing composition selected from epoxide fatty acids, epoxide vegetable oils and mixtures thereof and at least one secondary compound selected from the group consisting of fatty acids and alkoxylated derivatives thereof, alkoxylated polyols, alcohols, alkoxylated alcohols, alkylphenols, alkoxylated alkylphenols, alkylamides, alkoxylated alkylamides, acetylenic glycols, alkoxylated acetylenic glycols, polybasic acids, alkylene oxides, organo silicones and polymers thereof.

The epoxide containing composition and secondary compound are heated, preferably in an inert atmosphere, to obtain the desired defoamer composition.

The defoamer compositions of the present invention are effective in decreasing the foam level of aqueous mediums and in maintaining low foam levels, especially in hard mediums such as black liquor produced in the paper and pulp industry.

DETAILED DESCRIPTION OF THE INVENTION

The present invention is directed to defoamer compositions for controlling foaming aqueous systems. The defoamer compositions are based on the reaction product of epoxide fatty acids, epoxide vegetable oils and mixtures thereof with at least one of a group of compounds selected from fatty acids and alkoxylated derivatives thereof, alkoxylated polyols, alcohols, alkoxylated alcohols, alkylphenols, alkoxylated alkylphenols, alkylamides, alkoxylated alkylamides, acetylenic glycols, alkoxylated acetylenic glycols, polybasic acids, alkylene oxides, organo silicones and polymers thereof.

As used herein, the term "epoxide fatty acid" includes mixtures of fatty acids containing at least 20% by weight of at least one epoxide compound. The fatty acids include saturated and unsaturated fatty acids preferably those having from 10 to 20 carbon atoms. The term "epoxide vegetable oils" includes vegetable oils such as soybean oil, corn oil, safflower and the like which are composed of a mixture of fatty acids such as palmitic acid, stearic acid, oleic acid, linoleic acid, linolenic acid and the like. The epoxide content of the epoxide vegetable oil is typically in the range of from about 1.0 to 50% by weight, preferably about 2.0 to 25% by weight.

The fatty acids which can be reacted with the epoxide containing compositions include saturated and unsaturated fatty acids, preferably those having 10 to 20 carbon atoms. Examples include linoleic acid, linolenic acid and oleic acid. The fatty acids can be substituted with at least one alkoxy group, preferably having 1 to 50 carbon atoms such as methoxy, ethoxy, propoxy, polyoxyethylene, polyoxypropylene and copolymers and derivatives thereof.

The preferred alkoxylated polyols include those based on sorbitol where the alkoxy group or groups contains from 1 to 50 carbon atoms, preferably lower alkoxy including methoxy, ethoxy and propoxy.

The preferred alcohols are those having 10 to 20 carbon atoms (e.g. lauryl alcohol, stearyl alcohol and oleyl alcohol). When substituted with one or more alkoxy groups, the preferred alkoxy groups have from 1 to 50 atoms such as methoxy, ethoxy, propoxy, polyoxyethylene, polyoxypropylene and copolymers and derivatives thereof.

The preferred alkylphenols are those wherein the alkyl group has from 5 to 20 carbon atoms such as pentyl, hexyl and the like. The preferred alkoxylated derivatives include alkylphenols having at least one alkoxy group of from 1 to 50 carbon atoms. Examples of the alkoxy group include methoxy, ethoxy, propoxy, polyoxyethylene, polyoxypropylene and copolymers and derivatives thereof.

The alkylamides include those compounds wherein the alkyl group has from 4 to 20 carbon atoms such as butyl, dodecyl and tetradecyl. The alkoxylated derivatives include at least one alkoxy group having 1 to 50 carbon atoms such as methoxy, ethoxy, propoxy, polyoxyethylene, polyoxypropylene and copolymers derivatives thereof.

The acetylenic glycols and alkoxylated derivatives thereof include compounds like Surfynol (made by Air Products). Examples include tetramethyl decynediol and ethoxylated tetramethyl decynediol.

The polybasic acids which can be reacted in accordance with the present invention include organic acids. The preferred polybasic acids include dibasic and tribasic acids.

The alkylene oxides include those having from 2 to 400 carbon atoms, preferably from 30 to 300 carbon atoms such as polyoxyethylene, polyoxypropylene and copolymers thereof.

The organo silicones include polyether siloxanes such as polymethyl siloxanes and ethylene oxide/propylene oxide copolymers.

The starting materials which form the defoamer composition of the present invention are reacted at elevated temperatures, preferably in a substantially inert atmosphere. The reaction temperature is typically in the range of from 100° C. to 250° C. and may be conducted in several stages at successively increasing temperatures depending upon the reactants. The inert atmosphere may be provided by introducing nitrogen or other inert gases into the reaction vessel such as through a sparger.

The amount of the starting materials may vary over a wide range. Typically the weight ratio of the epoxide containing composition to the secondary compound is from about 1:2 to 1:100, preferably from about 1:10 to 1:20.

EXAMPLE 1

124.56 grams of soybean oil epoxide (obtained from Union Carbide), having a fatty acid composition of 11.5% by weight of palmitic acid, 4.0% by weight of stearic acid, 24.5% by weight of oleic acid, 53% by weight of linoleic acid and 7.0% by weight of linolenic acid; an epoxide content about 7.0% by weight based on the total weight of the composition; an iodine value of about 0.8; and an acid value of about 0.3 was added to 225.44 grams of ethoxylated lauryl alcohol.

The mixture was heated to a temperature of 200° C. for about 3½ hours under a nitrogen gas purge. The resulting product forming a defoamer composition in accordance with the present invention did not contain any residual oxirane.

EXAMPLE 2

2,125 grams of the soybean oil epoxide employed in Example 1 was added to 1000 grams of a mixture of dimer acid and polybasic acid [Empol 1043 manufactured by Henkel Corporation] comprised of 25 to 50% dimer acid and 50 to 75% polybasic acids.

The mixture was heated to a temperature of 100° C. under nitrogen for two hours and to 120° C. for an additional four hours. The resulting product constituting a defoamer composition of the present invention had a residual oxirane content of about 0.59% by weight.

EXAMPLE 3

103.11 grams of the soybean oil epoxide employed in Example 1, 246.89 grams of polyethylene glycol monoleate (PEG 200 monoleate manufactured by Henkel Corporation) and 0.35 grams of p-toluenesulfonic acid were combined. The mixture was heated to 200° C. under a nitrogen purge for seven hours. The resulting product constituting a defoamer composition of the present invention had a residual oxirane content of about 0.19% by weight.

EXAMPLE 4

39.55 grams of hexylene glycol were blended with 310.45 grams of the same soybean oil epoxide employed in Example 1. The pH of the hexylene glycol was adjusted to 11.0 with NaOH. The mixture was heated to about 150° C. for about 1.5 hours under a nitrogen sparge. Thereafter the temperature was raised to 175° C. for two hours and then to 200° C. for seven hours. The resulting product had a residual oxirane content of about 0.05% by weight.

EXAMPLE 5

The compositions produced in accordance with Examples 1–4 were tested for defoaming properties in accordance with the following.

600 ml of water at 80° C. were placed in a clear plastic cylinder comprised of a 2.5" O.D. polycarbonate tube containing an insert as described in U.S. Ser. No. 08/166,191 filed Dec. 13, 1993. Calibration tape (Scalafix Co. Ltd., 31 Colgrove Road, Loughborough, England) was affixed to the exterior of the cylinder to measure the level of foam therein.

500 ml of a black liquor, a foaming spent cooking liquor obtained from the treatment of soft wood fibers (obtained from International Paper Company of Georgetown, S.C.) were placed into the plastic cylinder and agitated at a rate that produces a head of foam 10–12 cm high in a period of time from about 20 to 60 seconds. The defoamer composition of Example 1 in the form of a 20% emulsion (200 µl of the defoamer composition) was added to the plastic cylinder. The foam height was recorded as a function of time and at a temperature of 98° C. and the results are shown in Table 1.

The test procedure was repeated for each of the defoamer compositions of Examples 2–4 and the results are also shown in Table 1.

TABLE 1

| Example | 15 sec | 30 sec | 45 sec | 60 sec | 75 sec | 90 sec | 120 sec | 150 sec | 180 sec |
|---|---|---|---|---|---|---|---|---|---|
| 1 | 6.9* | 6.1 | 6.1 | 5.8 | 5.3 | 5.4 | 5.4 | 5.3 | 5.6 |
| 2 | 5.5 | 4 | 3.8 | 3.8 | 3.8 | 4.1 | 4.4 | 4.5 | 4.8 |
| 3 | 6.8 | 6.3 | 5.8 | 5.4 | 5.5 | 5.5 | 5.9 | 6.1 | 6.1 |
| 4 | 5.1 | 4.5 | 4.7 | 4.8 | 4.8 | 5.1 | 5.7 | 5.9 | 6.3 |

*foam height measured in centimeters

As shown in Table 1, each of the defoamer compositions of the invention showed an immediate and significant reduction in foam height (knockdown level) followed by a significant period of time by which the reduced foam level was maintained.

EXAMPLE 6

The procedure set forth in Example 5 was repeated using the defoamer composition of Example 4 (100 µl) against a hard wood black liquor obtained from International Paper Company. Foam height was measured as a function of time at a temperature of 98° C. and the results are shown in Table 2.

TABLE 2

| Example | 15 sec | 30 sec | 45 sec | 60 sec | 75 sec | 90 sec | 120 sec | 150 sec | 180 sec |
|---|---|---|---|---|---|---|---|---|---|
| 5 | 7.5 | 6.5 | 6.1 | 5.9 | 5.8 | 5.9 | 6.1 | 6 | 6.2 |

As shown in Table 2, the defoamer composition of the present invention produced an immediate and significant decrease in foam height and maintained a reduced foam height for an extended period of time.

What we claim is:

1. A method of defoaming a black liquor obtained from the treatment of wood fibers comprising adding to the liquor a defoaming effective amount of a defoamer composition comprising the reaction product of at least one epoxide fatty acid compound selected from epoxide fatty acids, epoxide vegetable oils and mixtures thereof and at least one secondary compound selected from the group consisting of alkoxylated alkylamides having from 4 to 20 carbon atoms, ethoxylated tetramethyl decynediol, and polyether siloxanes.

2. The process of claim 1 wherein each of the alkoxylated compounds contain at least one alkoxy group having from 1 to 50 carbon atoms and are selected from the group consisting of methoxy, ethoxy, propoxy, polyoxyethylene, polyoxypropylene, and polyoxyethylene/polyoxypropylene copolymers.

3. The process of claim 1 wherein the epoxide fatty acid compound comprises a mixture of epoxide fatty acid compounds and contains at least 20% by weight of one single epoxide fatty acid compound.

4. The process of claim 1 wherein the epoxide content of the epoxide vegetable oil is from about 1.0 to 50% by weight.

5. The process of claim 1 wherein the alkylene oxides have from 2 to 400 carbon atoms and are selected from the group consisting of polyoxyethylene, polyoxypropylene, and polyoxyethylene/polyoxypropylene copolymers.

6. The process of claim 1 wherein the alkylene oxides have from 30 to 300 carbon atoms and are selected from the group consisting of polyoxyethylene, polyoxypropylene, and polyoxyethylene/polyoxypropylene copolymers.

7. The process of claim 1 wherein the weight ratio of the epoxide fatty acid compound to the secondary compound is from about 1:2 to 1:100.

* * * * *